G. L. GRAY.
FEED MECHANISM FOR GRASS TWINE MACHINES.
APPLICATION FILED OCT. 18, 1912.
1,097,424.
Patented May 19, 1914.
2 SHEETS—SHEET 1.
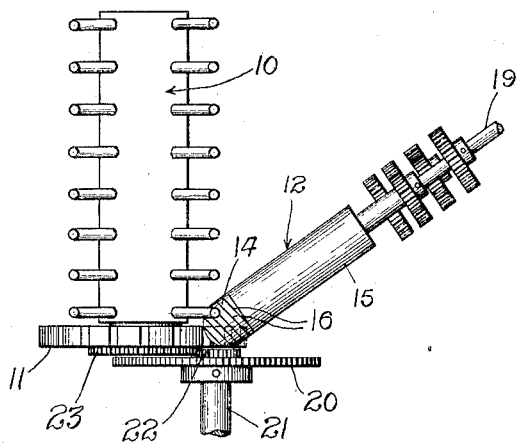
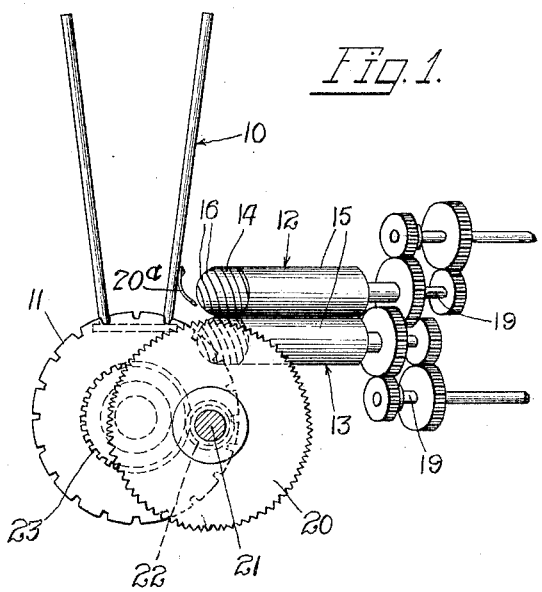
Witnesses:
Harry S. Gaither
Wm. Bond
Inventor:
George L. Gray.
by Bauning & Bauning
Atty's G. L. GRAY.
FEED MECHANISM FOR GRASS TWINE MACHINES.
APPLICATION FILED OCT. 18, 1912.
1,097,424.
Patented May 19, 1914.
2 SHEETS—SHEET 2.
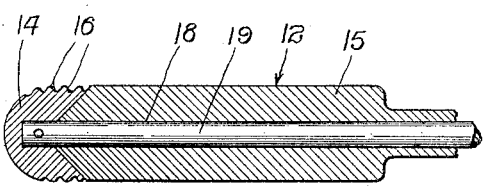
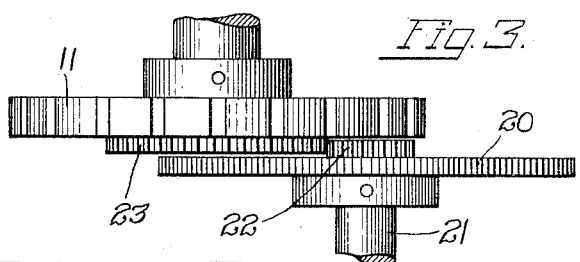
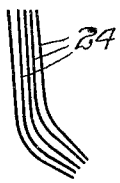 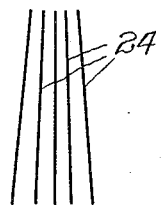 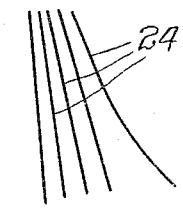
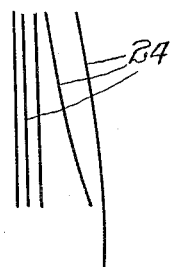 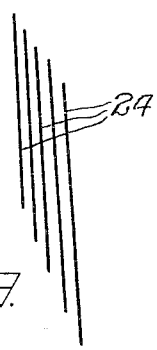
Witnesses:
Harry S. Gaither
Wm. P. Bond
Inventor:
George L. Gray.
by Bauning & Bauning
Atty's.
COLUMBIA PLANOGRAPH CO., WASHINGTON, D. C.

UNITED STATES PATENT OFFICE.

GEORGE L. GRAY, OF WEST PALM BEACH, FLORIDA, ASSIGNOR TO WAITE GRASS CARPET COMPANY, OF OSHKOSH, WISCONSIN, A CORPORATION OF WISCONSIN.

FEED MECHANISM FOR GRASS-TWINE MACHINES.

1,097,424.  Specification of Letters Patent.  Patented May 19, 1914.

Application filed October 18, 1912. Serial No. 726,557.

*To all whom it may concern:*

Be it known that I, GEORGE L. GRAY, a citizen of the United States, residing at West Palm Beach, county of Palm Beach, and State of Florida, have invented certain new and useful Improvements in Feed Mechanism for Grass-Twine Machines, of which the following is a specification.

The present invention relates to a mechanism more particularly adapted for use in feeding grasses to the mechanism which forms the same into grass twine.

The objects of the present invention are to provide means for spreading out and separating the grasses at the initiatory portion of the feeding operation, whereby the grasses are fed forward in successive order and approach the forming mechanism in staggered relation to one another, whereby the ends are overlapped; to provide a device supplementary to the feeding device which will spread out or separate the grasses prior to their entrance to the feeding mechanism; and to provide means for insuring the entrance of the grasses into the bite of the feed rolls as they are carried from the holder to the rolls.

The invention further consists in the features of construction and combination of parts hereinafter described and claimed.

In the drawings, Figure 1 is a front view of the mechanism of the present invention; Fig. 2 a plan view; Fig. 3 a detail plan view of the selector mechanism and the separating mechanism; Fig. 4 a sectional view of one of the feed rolls of the present invention; and Figs. 5 to 9 inclusive diagrammatic views, showing the position the grasses assume at different stages in the feeding operation.

In the art to which the present invention relates, a holder for a mass of grasses is employed and a selector or delivery mechanism is provided for flexing the ends of a bunch or wisp of grass from the mass within said holder, and placing them in the bite of feed rolls. It has been found that a wisp or bunch of short grasses, when delivered in a bunch through the feed rolls, will sometimes produce a twine lacking the necessary tensile strength, allowing the grasses in some cases to protrude from the twine, so that when the twine is eventually formed into mats or rugs, these ragged edges must be cut off before the article would be in a sufficiently finished condition for the market. It has been found that a twine of the necessary tensile strength can be made by feeding the twine to the forming mechanism in staggered order, thus producing a better bond between the stems.

The present invention deals with a means for arranging the grasses at the initial portion of the feeding operation, whereby they are fed to the twine forming mechanism in the staggered relation desired.

Referring to the drawings, the device is illustrated as used in conjunction with a grass holder 10 of any suitable size and formation, and located adjacent the forward end of said holder is a selector which, in the construction shown, is in the form of a notched disk 11. The disk, as it revolves past the end of the holder, pulls the ends of a wisp of grass out from the holder and flexes and delivers them into the bite of the feed rolls, the notches of said disk being of a size to accommodate a number of said grasses.

The feed rolls which form one of the main features of the present invention consist of an upper set of rolls 12 and a lower set of rolls 13. It is understood, however, that the terms upper and lower merely refer to the arrangement of mechanism illustrated in the drawings, and that the rolls may be placed side by side and accomplish the same result if it is desired to feed the grasses vertically instead of horizontally. Each set of feed rolls 12 and 13 comprise a primary feed roll 14 and a secondary feed roll 15. The primary feed roll is preferably provided with a spiral groove 16 throughout its length. Each of the secondary feed rolls is provided with a longitudinal bore 18, and through this bore extends a spindle or rod 19 connected to each of the primary feed rolls 14. The primary rolls 14 and the secondary rolls 15 are each driven by independent mechanism, and the primary rolls are driven at considerably higher rate of speed than the secondary rolls. Thus, when the grasses are placed in the bite of the primary rolls, the first grass which enters into the bite of these rolls will be advanced rapidly in a direction longitudinally of said rolls and into the bite of the secondary rolls. After it has reached the latter position, it will be fed forward longitudinally of itself and will have been so fed a substantial distance before the next grass is placed in the bite of the secondary rolls. By this arrangement, it is obvious that the grasses will be fed forward to the forming mechanism in successive order and in staggered relation to one another which is the desired method of feeding the grasses. In order to more effectively accomplish the spreading and separating of the grasses, in case it should be desired, I have devised a separating mechanism, which, in the form illustrated in the drawings, consists of a serrated or notched disk 20 mounted upon a trunnion 21, and the disk 20 is driven by means of a gear 22 meshing with a gear 23 secured to the selector 11.

The grasses 24, when initially withdrawn from the holder by the action of the selector 11, assume the position shown in Fig. 5; that is, the ends are bent or flexed toward the feed roll. As soon as the ends are brought in contact with the separating mechanism 20, they are spread out into the fan shape shown in Fig. 6. This is produced by the milled or toothed edge of the disk 20 taking hold of each individual grass and separating or spreading it apart from the others. In this spread-out condition, they enter the bite of the primary feed rolls 14, and the first grass to enter the bite of said rolls is quickly deflexed or moved in a direction longitudinally of the feed rolls, and assumes the position shown in Fig. 7. This grass will have entered into the bite of the secondary rolls 15 before the second grass has entered the bite of the primary rolls.

The grass which is already in the bite of the secondary rolls is pulled forward by the action of these rolls and fed in the direction longitudinally of itself, and when it has thus been fed for a portion of its length the second grass will have entered the bite of the primary rolls and be deflected in a similar manner into the bite of the secondary rolls, as indicated in Fig. 8, but owing to the fact that the first of the grasses has already been forwarded a portion of its length, the second grass, when it in turn is fed forward, will be in staggered relation to the first grass, and thus the grasses of the wisp of grass will, when delivered to the forming mechanism, approach said mechanism in the staggered, overlapped arrangement shown in Fig. 9. In this manner the grasses are fed to the forming mechanism, and as will be apparent they will be arranged in successive order and in staggered relation, eliminating the bunched or lumpy effect which is produced when they are fed in the usual and well known manner and eliminating the straggling ends that have hitherto ofttimes been found.

A flexible or other member 20ª is secured to the holder and extends to a point adjacent the bite of the primary feed rolls. This is to prevent upward flexing of the grasses during their conveyance from the holder to the feed rolls, and in fact constitutes a guide for insuring the correct entrance of the grasses into the above rolls.

I claim:

1. In a device of the class described, the combination of a holder for grasses, primary feed rolls, secondary feed rolls, said rolls being arranged in end to end relation to each other, means operatively connected for revolving said primary rolls and said secondary rolls at different rates of speed, and means for delivering grasses from said holder into the bite of said rolls, substantially as described.

2. In a device of the class described, the combination of a holder for grasses, primary feed rolls, secondary feed rolls, said rolls being arranged in end to end relation to each other, means operatively connected for revolving said primary rolls and said secondary rolls at different rates of speed, means for delivering wisps of grasses from said holder into the bite of said rolls, and means for spreading out the wisps of grasses prior to their entrance into the bite of the rolls, substantially as described.

3. In a device of the class described, the combination of a holder for grasses, primary feed rolls, secondary feed rolls, said rolls being arranged in end to end relation to each other, means operatively connected for revolving said primary rolls and said secondary rolls at different rates of speed, means for delivering wisps of grasses from said holder into the bite of said rolls, and means for guiding said wisps during their delivery from the holder to the rolls, substantially as described.

4. In a device of the class described, the combination of a holder for grasses, primary feed rolls, secondary feed rolls, said rolls being arranged in end to end relation to each other, means operatively connected for revolving said primary rolls and secondary rolls at different rates of speed, means for delivering wisps of grasses from said holder into the bite of said rolls, means for spreading out the wisps of grasses prior to their entrance into the bite of the rolls, and means for guiding said wisps during their delivery from the holder to the rolls, substantially as described.

5. In a device of the class described, the combination of a holder for grasses, companion primary feed rolls, companion secondary feed rolls, each primary roll having its axial center alined with the axial center of a secondary roll, said secondary rolls having an axial bore, a spindle connected to each of said primary rolls and extending through said bore, means operatively connected for revolving said primary rolls and secondary rolls at different rates of speed, and means for delivering wisps of grass from said holder into the bite of said primary rolls, substantially as described.

6. In a device of the class described, the combination of a holder for grasses, companion primary feed rolls, companion secondary feed rolls, each primary roll having its axial center alined with the axial center of a secondary roll, said secondary rolls having an axial bore, a spindle connected to each of said primary rolls and extending through said bore, means operatively connected for revolving the primary rolls at a higher rate of speed than the secondary rolls, means for delivering wisps of grasses from said holder into the bite of said primary rolls, and means for spreading out the wisps of grasses prior to their entrance into the bite of the primary rolls, substantially as described.

7. In a device of the class described, the combination of a holder for grasses, companion primary feed rolls, companion secondary feed rolls, each primary roll having its axial center alined with the axial center of a secondary roll, said secondary rolls having an axial bore, a spindle connected to each of said primary rolls and extending through said bore, means operatively connected for revolving the primary rolls at a higher rate of speed than the secondary rolls, means for delivering wisps of grasses from said holder into the bite of said primary rolls, means for spreading out the wisps of grasses prior to their entrance into the bite of the primary rolls, and means for guiding said wisps during their movement from the holder to the primary rolls, substantially as described.

8. In a device of the class described, the combination of a holder for grasses, helically grooved companion primary feed rolls, companion secondary feed rolls, each primary roll having its axial center alined with the axial center of a secondary roll, said secondary rolls having an axial bore, a spindle connected to each of said primary rolls and extending through said bore, means operatively connected for revolving the primary rolls at a higher rate of speed than the secondary rolls, means for delivering wisps of grasses from said holder into the bite of said primary rolls, and means for spreading out the wisps of grasses prior to their entrance into the bite of the secondary rolls, substantially as described.

9. In a device of the class described, the combination of a holder for grasses, helically grooved primary feed rolls, secondary feed rolls, said rolls being arranged in end to end relation to each other, means operatively connected for revolving said primary feed rolls at a different rate of speed from the secondary rolls, and means for delivering grasses from said holder into the bite of said primary rolls, substantially as described.

10. In a device of the class described, the combination of a holder for grasses, helically grooved primary feed rolls, secondary feed rolls, said rolls being arranged in end to end relation to each other, means operatively connected for revolving the primary feed rolls at a higher rate of speed than the secondary rolls, means for delivering wisps of grasses from said holder into the bite of said primary rolls, and means for spreading out said wisps prior to their delivery from the holder to the primary rolls, substantially as described.

11. In a device of the class described, the combination of a holder for grasses, companion helically grooved primary feed rolls, companion secondary feed rolls, each of said primary rolls having its axial center alined with the axial center of a secondary roll, said secondary rolls having an axial bore, a spindle connected to each of said primary rolls and extending through said bore, means operatively connected for revolving the primary rolls at a different rate of speed from the secondary rolls, and means for delivering wisps of grasses from said holder into the bite of said primary rolls, substantially as described.

12. In a device of the class described, the combination of a holder for grasses, companion helically grooved primary feed rolls, companion secondary feed rolls, each of said primary rolls having its axial center alined with the axial center of a secondary roll, said secondary rolls having an axial bore, a spindle connected to each of said primary rolls and extending through said bore, means operatively connected for revolving the primary rolls at a different rate of speed from the secondary rolls, means for delivering wisps of grasses from said holder into the bite of said primary rolls, and means for spreading out the wisps of grasses prior to their entrance into the bite of the primary rolls, substantially as described.

13. In a device of the class described, the combination of a holder for grasses, companion helically grooved primary feed rolls, companion secondary feed rolls, each of said primary rolls having its axial center alined with the axial center of a secondary roll, said secondary rolls having an axial bore, a spindle connected to each of said primary rolls and extending through said bore, means operatively connected for revolving the primary rolls at a higher rate of speed than the secondary rolls, means for delivering wisps of grasses from said holder into the bite of said primary rolls, means for spreading out the wisps of grasses prior to their entrance into the bite of said rolls, and means for guiding said wisps during their movement from the holder to said rolls, substantially as described.

14. In a device of the class described, the combination of a holder for grasses, primary feed rolls, secondary feed rolls, said rolls being arranged in end to end relation to each other, means operatively connected for revolving the primary rolls at a higher rate of speed than the secondary rolls, means for delivering wisps of grasses from said holder into the bite of the primary feed rolls, and a notched member for spreading out said wisps of grass prior to their entrance into the bite of the primary feed rolls, substantially as described.

15. In a device of the class described, the combination of a holder for grasses, feed rolls, rotative means for selecting wisps of grasses within the holder and delivering them into the bite of the feed rolls and a rotative member located adjacent to and traveling parallel with said selecting means for spreading out the wisps of grasses prior to their entrance into the feed roll, the center of rotation of said spreading member being off center with respect to the center of movement of the selecting means, substantially as described.

GEO. L. GRAY.

Witnesses:
 THOMAS A. BANNING, Jr.,
 EPHRAIM BANNING.

---

Copies of this patent may be obtained for five cents each, by addressing the "Commissioner of Patents, Washington, D. C."